United States Patent
Åström et al.

(10) Patent No.: US 10,856,165 B2
(45) Date of Patent: Dec. 1, 2020

(54) METHOD OF REPORTING CHANNEL STATE INFORMATION, COMMUNICATION DEVICE AND COMPUTER PROGRAM

(71) Applicant: Telefonaktiebolaget LM Ericsson (publ), Stockholm (SE)

(72) Inventors: Magnus Åström, Lund (SE); Maomao Chen, Lund (SE); Fredrik Nordström, Lund (SE); Torgny Palenius, Barsebäck (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 96 days.

(21) Appl. No.: 16/070,714

(22) PCT Filed: Dec. 5, 2016

(86) PCT No.: PCT/EP2016/079758
§ 371 (c)(1),
(2) Date: Jul. 17, 2018

(87) PCT Pub. No.: WO2017/137109
PCT Pub. Date: Aug. 17, 2017

(65) Prior Publication Data
US 2019/0037428 A1    Jan. 31, 2019

Related U.S. Application Data

(60) Provisional application No. 62/292,445, filed on Feb. 8, 2016.

(51) Int. Cl.
*G06F 11/00* (2006.01)
*H04W 24/10* (2009.01)
(Continued)

(52) U.S. Cl.
CPC .......... *H04W 24/10* (2013.01); *H04B 7/0417* (2013.01); *H04B 7/0626* (2013.01);
(Continued)

(58) Field of Classification Search
None
See application file for complete search history.

(56) References Cited

U.S. PATENT DOCUMENTS 9,681,425 B2 * 6/2017 Geirhofer ............ H04B 7/0417
2008/0132281 A1 * 6/2008 Kim ....................... H04B 7/063
455/562.1

(Continued)

FOREIGN PATENT DOCUMENTS

WO    2011124537 A1    10/2011

OTHER PUBLICATIONS

3GPP TS 36.211 V13.0.0, 3rd Generation Partnership Project; Technical Specification Group Radio Access Network; Evolved Universal Terrestrial Radio Access (E-UTRA); Physical channels and modulation (Release 13), Dec. 2015, pp. 1-141.
(Continued)

*Primary Examiner* — Gerald A Smarth
(74) *Attorney, Agent, or Firm* — Patent Portfolio Builders, PLLC (57) ABSTRACT

A communication device is arranged to operate in a cellular communication system and report Channel State Information, CSI, including a channel quality by a Channel Quality Indicator, CQI, which reports a CQI set. The communication device comprises a receiver arranged to receive antenna-specific reference signals, a channel estimator arranged to evaluate channel conditions from the reference signals to determine values of a CQI set, a reporting processor arranged to determine whether a bounded differential reporting format prevents values of the CQI set to be accurately
(Continued)

reported, and to determine a CQI set such that the bounded differential reporting format allows the values of the CQI set to be reported to reduce under-reporting or over-reporting errors that arise from the use of the bounded differential reporting format, and to form a CSI report including the values of the CQI set using the bounded differential reporting format, and a transmitter arranged to send the CSI report. A method and computer program for implementing the method are also disclosed.

11 Claims, 5 Drawing Sheets

(51) Int. Cl.
    *H04B 7/06*     (2006.01)
    *H04B 17/309*   (2015.01)
    *H04B 7/0417*   (2017.01)

(52) U.S. Cl.
    CPC ......... *H04B 7/0632* (2013.01); *H04B 7/0641* (2013.01); *H04B 17/309* (2015.01)

(56) References Cited

U.S. PATENT DOCUMENTS

| | | | |
|---|---|---|---|
| 2008/0268785 A1* | 10/2008 | McCoy | H04B 7/0417 |
| | | | 455/67.11 |
| 2009/0170442 A1 | 7/2009 | Asanuma et al. | |
| 2013/0336214 A1* | 12/2013 | Sayana | H04B 7/024 |
| | | | 370/328 |
| 2014/0301509 A1 | 10/2014 | Xu et al. | |
| 2015/0341092 A1* | 11/2015 | Park | H04B 7/0469 |
| | | | 370/329 |
| 2016/0227530 A1* | 8/2016 | Davydov | H04B 7/0626 |
| 2019/0069193 A1* | 2/2019 | Astrom | H04W 52/028 |

OTHER PUBLICATIONS

3GPP TS 36.213 V13.0.1 (Jan. 2016), 3rd Generation Partnership Project; Technical Specification Group Radio Access Network; Evolved Universal Terrestrial Radio Access (E-UTRA); Physical layer procedures (Release 13), Jan. 2016, pp. 1-326.

* cited by examiner

METHOD OF REPORTING CHANNEL STATE INFORMATION, COMMUNICATION DEVICE AND COMPUTER PROGRAM

TECHNICAL FIELD

The present invention generally relates to a method of reporting channel state information, a communication device and a computer program. In particular, the present invention relates to adapting the channel state information report to improve performance in multi-rank enabled wireless communication systems.

BACKGROUND

In mobile communications, the transmission conditions change over time and space. Therefore, for a base station (BS) to properly schedule the transmission of data to an item of user equipment (UE), using appropriate modulation and code rates, the UE regularly reports channel conditions to the BS. In one approach to sending channel state information (CSI), the UE sends regular CSI reports. A CSI report comprises information about the channel including a Channel Quality Indicator (CQI) set, where the set comprises one or more CQIs. Thus, the terms "CSI report", "CSI reporting", etc. and "CQI report", "CQI reporting", etc. are often interchangeably used in colloquial language within the field, and so also in this disclosure. The CQI is an index value that efficiently quantizes measured signal quality at the UE. Further, the terms "communication device", and "UE" are interchangeably used in colloquial language within the field, and so also in this disclosure.

Of course, there may be many UEs hosted on the same BS at the same time, and all UEs need to send CSI reports. Further, each UE may have multiple CQI values to report. For example, CSI reporting for an Orthogonal Frequency Division Multiplex (OFDM) downlink signal may require UEs to report wideband CQI values, along with one or more narrowband CSI values that are restricted to particular frequency sub-bands of interest. As such, CSI reports must contain as few bits as possible.

One approach to reducing the number of bits needed to report multiple CQI values adopts a "differential" reporting approach. With differential reporting, one or more CQI values are reported relative to one or more other CQI values. Long Term Evolution (LTE), as standardized by the Third Generation Partnership Project (3GPP) provides a specific example of differential reporting. Assuming LTE MIMO (Multiple-Input-Multiple-Output) transmission, an example CSI report from an LTE UE to an eNodeB includes one or more of the following items: a rank indicator (RI), one or more CQI values for the whole bandwidth, CQI values for parts of the bandwidth, and Precoding Matrix Indexes (PMIs) to guide transmission precoding by the BS.

The "rank" of a MIMO channel defines how many layers can be used in the transmission of data streams from a MIMO transmitter to a MIMO receiver, and the maximum rank is given as $\min(N_{TX}, N_{RX})$. Here, "N" represents the number of transmit antennas (TX) or receive antennas (RX). UEs use the RI to indicate a rank preference, which the eNodeB may use in determining the appropriate channel rank to use for transmissions to the UE.

Currently, the LTE standards use a baseline antenna configuration of 2×2, which denotes two transmit antennas and two receive antennas, and provide for a maximum of two "codewords." Codewords are coded bits that are mapped to modulation symbols, which are then mapped to one or more layers. Each codeword thus may be understood as a different data stream, where the two codewords may have different modulation and coding schemes applied to them. Further, according to the (current) LTE standards, each codeword may use up to four layers in its transmission.

Thus, a UE receiving LTE MIMO transmissions on the downlink reports a CQI value for each codeword, where the CQI value reported for one of the codewords represents a differential value that specifies a limited-range offset relative to the CQI value reported for the other codeword. In more detail, assume a CSI reporting mode of "PUCCH 1-1" and a "Rank 2" transmission. (The "PUCCH 1-1" mode denotes CSI reporting by the UE on the Physical Uplink Control Channel (PUCCH), with one wideband CQI report, one wideband precoding matrix indicator (PMI) and a rank report. In this context, the UE reports a 4-bit CQI value for the first codeword (CW1) and a 3 bit-differential CQI for the second codeword (CW2).

The differential CQI is defined as the CQI value determined for the second codeword (CQI2), as constrained by the differential offset limit of [−4, 3]. In other words, the CQI value for the second codeword is reported relative to the CQI value for the first codeword using three bits, instead of four bits. Therefore, CQI2 can take on only eight index values falling within the stipulated offset interval [−4, 3]. For more information regarding this formulation, and CQI reporting in general, within the LTE context, please refer to the following two documents: 3GPP 36.213, "Physical layer procedures", v13.0.1 (2016); and 3GPP 36.211, "Physical Channels and Modulation", v13.0.0 (2016).

One approach of reporting channel quality is presented in WO 2011/124537 where antenna port-specific reference signals are received at a communication transceiver device and it is determined whether multi-rank transmission by the second communication transceiver is desired based on evaluating channel conditions as estimated from reference signals. When multi-rank transmission is desired a multi-rank Channel Quality Information (CQI) report is sent which reports two or more CQI values for use in adapting multi-rank transmission to the first communication transceiver device, using a reporting order that dictates which reported CQI value or values are reported as absolute values and which reported CQI value or values are reported as offsets relative to one or more of the absolute values, using a bounded differential reporting format. To reduce under-reporting or over-reporting errors that arise from the use of the bounded differential reporting format, the communication transceiver device dynamically determines the reporting order. This advantageously provides for an increase in communications throughput.

Although the improvement provided by manipulating the order or manner in which CQI values are reported in a multi-rank CQI report that constrains one or more such values according to reporting order, there may be cases where the multi-rank reporting still fails to provide proper throughput. It is suggested in WO 2011/124537 that in such cases single-rank CQI reporting should be contemplated to determine if that provides a better channel capacity. US 2009/170442 discloses a bounded reporting format where differential values at upper or lower limit domains are adapted. US 2014/301509 discloses an approach for selecting values for CQI that optimizes an objective function.

However, there is a desire to find a multi-rank CQI reporting approach which at least for some cases provides a better use of channel capacity.

SUMMARY

The invention is based on the inventors' realization that when being limited to the bounded differential reporting format as discussed above, the utilized channel capacity may be improved by adapting the report for differential multi-rank CQI slightly.

According to a first aspect, there is provided a method of reporting Channel State Information (CSI) including a multi-rank channel quality by a multi-rank Channel Quality Indicator (CQI) which reports a CQI set. The method comprises receiving antenna-specific reference signals, evaluating channel conditions from the reference signals to determine values of a CQI set, determining whether a bounded differential reporting format prevents values of the CQI set to be accurately reported, and determining a CQI set such that the bounded differential reporting format allows the values of the CQI set to be reported to reduce under-reporting or over-reporting errors that arise from the use of the bounded differential reporting format, and forming a CSI report including the values of the CQI set using the bounded differential reporting format, and sending the CSI report.

The determining of the CQI set comprises altering at least one of the extreme values of the CQI set when the bounded differential reporting format prevents the extreme values of the CQI set to be accurately reported. The altering of the at least one of the extreme values of the CQI set comprises the steps of a) altering a first one of the extreme values of the CQI set and determining a first performance metric for the CQI set comprising the first altered extreme value, b) altering the second one of the extreme values of the CQI set and determining a second performance metric for the CQI set comprising the second altered extreme value of the CQI set, c) determining which of the first and second performance metrics represents a preferred performance metric and assigning the corresponding values as new first and second extreme values, and d) determining whether the bounded differential reporting format allows the new first and second extreme values to be accurately reported, and if they do not, repeating steps a)-d).

The altering of any of the first and the second extreme value in steps a) and b), respectively, may comprise increasing or decreasing the extreme value by an amount such that a difference between the first and the second extreme value decreases.

The method may further comprise comparing a performance metric of a CSI candidate report including a multi-rank CQI set with a performance metric of CSI candidate report including a multi-rank CQI set for another transmission setup comprising at least one of a different rank, a different precoding matrix indicator and different CQI values, and when the performance metric for the CSI candidate report of the another transmission setup is preferred, forming and sending that CSI report instead.

The method may further comprise comparing a performance metric of a CSI candidate report including the multi-rank CQI set with a performance metric of a CSI candidate report including a single-rank CQI set, and when the performance metric of the single-rank CQI set is preferred, sending the CSI report including the single-rank CQI set instead of the one including the multi-rank CQI set.

The determining of a performance metric may comprise looking up a table based on measured values from the channel evaluation to achieve at least a set of performance values and corresponding CQI set, and estimating an aggregate performance metric from the set of performance values for a CQI set to be evaluated.

According to a second aspect, there is provided a communication device arranged to operate in a cellular communication system and report Channel State Information (CSI) including a channel quality by a Channel Quality Indicator (CQI) which reports a CQI set. The communication device comprises a receiver arranged to receive antenna-specific reference signals, a channel estimator arranged to evaluate channel conditions from the reference signals to determine values of a CQI set, a reporting processor arranged to determine whether a bounded differential reporting format prevents values of the CQI set to be accurately reported, and to determine a CQI set such that the bounded differential reporting format allows the values of the CQI set to be reported to reduce under-reporting or over-reporting errors that arise from the use of the bounded differential reporting format, and to form a CSI report including the values of the CQI set using the bounded differential reporting format, and a transmitter arranged to send the CSI report. The reporting processor is arranged to determine the CQI set by altering at least one of the extreme values of the CQI set when the bounded differential reporting format prevents the extreme values of the CQI set to be accurately reported. The reporting processor is arranged to alter the at least one of the extreme values of the CQI set by being arranged to a) alter a first one of the extreme values of the CQI set and determine a first performance metric for the CQI set comprising the first altered extreme value, b) alter the second one of the extreme values of the CQI set and determine a second performance metric for the CQI set comprising the second altered extreme value of the CQI set, c) determine which of the first and second performance metric that represents a preferred performance metric and assign the corresponding values as new first and second extreme values, d) determine whether the bounded differential reporting format allows the new first and second extreme values to be accurately reported, and if they do not, repeat a)-d).

The reporting processor may be arranged to alter any of the first and the second value in a) and b), respectively, by being arranged to increase or decrease the value by an amount such that a difference between the first and the second value decreases.

The reporting processor may further be arranged to compare a performance metric of a CSI candidate report including a multi-rank CQI set with a performance metric of CSI candidate report including a multi-rank CQI set for another transmission setup comprising at least one of a different rank, a different precoding matrix indicator and different CQI values, and when the performance metric for the another transmission setup is preferred, to form the CSI report including a CQI set of the multi-rank CQI for the another transmission setup and to cause the transmitter to send that CSI report.

The reporting processor may further be arranged to compare a performance metric of a CSI candidate report including the multi-rank CQI set with a performance metric of a CSI candidate report including a single-rank CQI set, and when the performance metric of the single-rank CQI set is preferred, the reporting processor may be arranged to cause the transmitter to send the CSI report including the single-rank CQI set instead of the one including the multi-rank CQI.

The reporting processor may be arranged to determine a performance metric by being arranged to look up a table based on measured values from the channel evaluation to achieve at least a set of performance values and corresponding CQI set, and to estimate an aggregate performance metric from the set of performance values for a CQI set to be evaluated.

According to a third aspect, there is provided a computer program comprising instructions which, when executed on a processor of a communication device, causes the communication device to perform the method according to the first aspect.

BRIEF DESCRIPTION OF THE DRAWINGS

The above, as well as additional objects, features and advantages of particular embodiments of the present invention, will be better understood through the following illustrative and non-limiting detailed description of certain embodiments of the present invention, with reference to the appended drawings.

DETAILED DESCRIPTION

The embodiments of the present invention disclosed herein generally relate to a method of reporting channel state information and to a communication device performing the method. In particular, certain embodiments relate to multi-rank channel quality indicator, CQI, reporting issues related to differential reporting format of multi-rank CQI sets. Other embodiments also relate to a computer program for implementing the method.

For the easier understanding of this disclosure, procedures of physical layer of an exemplary communication system will be explained. The communication system may be a 3GPP LTE system or an LTE-like system, or any other communication system relying on a bounded differential reporting approach of channel status.

Transport block (TB) data arriving at the physical layer, PHY, from higher layers are first appended with a 24-bit checksum, such as Cyclic Redundancy Check (CRC), to the TB. This CRC is used to determine whether the transmission was successful or not, and triggers Hybrid Automatic Repeat reQuest (HARQ) to send an ACK or NACK, as appropriate. Then, the TB is segmented into code blocks (CB) which for example may be between 40 and 6144 bits long. If the TB is too small, it is padded up to 40 bits, and if the TB is too big, it is divided into smaller pieces, each of which gets an additional 24 bit check sum, such as CRC. Each CB is then encoded with for example a ⅓ turbo coder and reassembled into a single code word (CW). A CW, then, is essentially a TB with error protection. A communication device, such as a UE, may be configured to receive one or two TBs or CWs in a single transmission interval.

The physical layer then converts each CW into modulation symbols. For each CW, the following steps is preferably taken: Scrambling the contents of each CW, converting the bit sequences into the corresponding modulation symbols (using e.g. Quadrature Phase Shift Keying (QPSK), 16QAM, 64QAM or 256QAM (Quadrature Amplitude Modulation)), and assigning the modulation symbols to one or more layers, i.e. transmissions according to MIMO, depending on the specific transmission scheme being used. In the case of a single transmit antenna, the last step is straightforward: the contents of the CW are mapped to a single layer. For transmit diversity, the approach is almost as straightforward: the symbols from the CW are distributed evenly across the multiple layers in a round-robin fashion. In spatial multiplexing transmissions, one or more CWs are distributed across multiple layers. As demonstrated for example in 3GPP LTE specification 36.211, v. 13.0.0, table 6.6.6.2-1, where a CW-to-layer mapping for spatial multiplexing is shown, there are a multitude of configurations. Table 1 below illustrates an example of CW-to-layer mapping.

TABLE 1

Example of CW-to-layer mapping

| # of CWs | # of Layers | Mapping Condition |
| --- | --- | --- |
| 1 | 1 | Single layer mapping |
| 1 | 2 | Every second CW symbol is mapped to $1^{st}$ and $2^{nd}$ layers, respectively |
| 2 | 2 | One CW per layer |
| 2 | 3 | $1^{st}$ CW to $1^{st}$ layer, $2^{nd}$ CW on $2^{nd}$ and $3^{rd}$ layers |
| 2 | 4 | $1^{st}$ CW is mapped onto first two layers and $2^{nd}$ CW is mapped onto final two layers |

The number of layers used in any particular transmission depends on the Rank Indication (RI) feedback from the UE, which identifies how many layers the UE can discern from the channel by using pilot symbols.

The final steps apply any required precoding adjustments and assign the modulation symbols to the physical resources. First, the required precoding factors are applied to the modulation symbols in each layer. Then, the pre-coded symbols are mapped to the appropriate antenna ports, after which the modulation symbols to be transmitted are assigned on each antenna port to specific resource elements. Finally, the time-domain Orthogonal Frequency-Division Multiplex (OFDM) signal is generated for each antenna port.

In order to utilize a given spectrum efficiently, a UE feeds back CSI that an eNodeB base subsequent transmission on. CSI typically includes a CQI representing certain setups of the modulation and coding scheme (MCS), a precoding matrix indicator (PMI), representing the preferred precoding matrix, and a rank indicator (RI), representing the number of parallel spatial streams that the UE can resolve. CQI and PMI are conditioned on a certain RI.

In LTE, CSI can be reported both periodically and aperiodically. Periodical reporting is done on the Physical Uplink Control Channel (PUCCH) whereas aperiodic reporting is done on the Physical Uplink Share Channel (PUSCH). Furthermore, a UE configured in transmission modes (TMs) 3, 4, 8, 9 or 10, may utilize spatial multiplexing, receiving two CWs simultaneously, in order to increase throughput. In that case, and for periodic CSI reporting, the CQI values in respective CWs are reported such that the CQI value of the first CW is for example reported fully with four bits, whereas only a three-bit difference is reported for the CQI value of the second CW.

The requirement of the CSI report is that the UE should report the transmission setup for which the highest throughput is achieved with 10% BLock Error Rate (BLER) for the given channel conditions. One way of doing that is to exhaustively search through the set comprising all possible combinations of PMI and RI, and derive mutual information (MI), wherein MI then may be translated into CQI values, and wherein performance metric based on MI is computed for each CW for each combination, aggregated over both CWs, for the given channel. The CQI pair resulting from the largest aggregated MI is consequently the preferred CQI pair. However, due to the limited CQI encoding capabilities using differentially reported CQI, the effect may be that for example CQI2 of the preferred CQI pair is reported erroneously (or CQI1 when employing for example the approach demonstrated in WO 2011/124537).

However, by taking the dynamic limitations in the differentially reported CQI into consideration when determining a preferred CQI for CQI reporting in multi-rank transmissions, the over-reporting or under-reporting issues may be reduced. This is done by investigating a preferred CW capacity pair, which may be comprised of MI, CQI, MCS etc., and if the two CW capacities are such that the difference in reported CQI will exceed the limitations of a differentially reported CQI, another preferred CW capacity pair is selected, for which CQI is then reported. This provides for better predictability of the impact of not being able to report the originally determined CQI values. Some advantages of the proposed approach are that it is likely to increase throughput and utilization of sparse resources since the deviation from an ideal reporting is made deliberately and not randomly. Indirectly this may also imply improved performance in other parameters e.g., decreased latency.

The CQI reporting with differentially reported CQI values in multi-rank transmissions may, due to the CQI value of a second CW, CQI2, not report the full range of CQI values, but is instead limited to a range around the CQI value of the first CW, CQI1, such that $$CQI1-4 \leq CQI2 \leq CQI1+3$$

In the event of too much channel dynamics, such that $$CQI1 \ll CQI2, \text{ or} \quad (1)$$

$$CQI1 \gg CQI2, \quad (2)$$

the differentially reported CQI will prevent the UE from reporting the preferred CQI value for the second CW, CQI2. The result is that either (1) a too low or (2) a too high value for CQI2 will be reported instead. However, by handling the effects of limited differential CQI reporting, in order to be able to report the preferred CQI pair, given the limitations of the CQI report, performance loss due to under-reporting and/or over-reporting is limited. This is achieved by first receiving antenna specific reference signals from a second communications device.

The UE may then, according to an embodiment that will be further discussed below, determine whether a single rank or a multi-rank transmission is preferred. If a single rank transmission is preferred, it is not feasible to use a differentially reported CQI.

In case of a multi-rank transmission is preferred, the UE may compute performance metrics for at least a plurality of possible RI and PMI combinations. Ideally, the best performance metric is selected, and a preferred CQI pair is computed. By comparing the CQI pair of the two CWs, the communication device may realize if CQI2 may be reported correctly or not, i.e. without or with limiting the second CW. A reported CQI pair may be defined as a CQI pair where no extra limitation is needed on the second CW. Thus, if the channel dynamics prevents the preferred CQI2 to be reported such that CQI2 will be correctly reported, the UE alters the preferred CQI pair or extremes of a CQI set such that it may be reported correctly, and a corresponding performance metric (throughput or MI) may be recomputed. Again, the MIs of all RI and PMI combinations are compared, from which again the maximum MI is selected and another CQI pair is computed, until a preferred CQI pair is found that allows for a reported CQI where impact of any over-reporting and/or under-reporting is reduced. Having done that, the UE transmits a CQI report including the preferred CQI pair to a second communications device, e.g. an eNodeB. In one embodiment the redetermination may involve altering the preferred CQI values such that the difference falls below the above limits. In one embodiment the altering may involve reducing or increasing the lowest or highest CQI value, respectively, in the CQI pair, until the altered CQI pair may be reported such that the impact is reduced. In a further embodiment, the altering may include a throughput or MI estimation of a number of altered CQI pairs such that the altered CQI pair is the CQI pair providing the highest throughput or MI within the restrictions of the differential reporting of the CQI pair. A limited complexity, iterative procedure may be performed such that CQI1 and CQI2 are iteratively altered until CQI2 may be reported considering the bounds of the differential reporting. In brief, one aim may be that BLER does not hit 0% and 100%, which would be effects of too much under-reporting and over-reporting, respectively, for using the resources efficiently.

Figure 1:
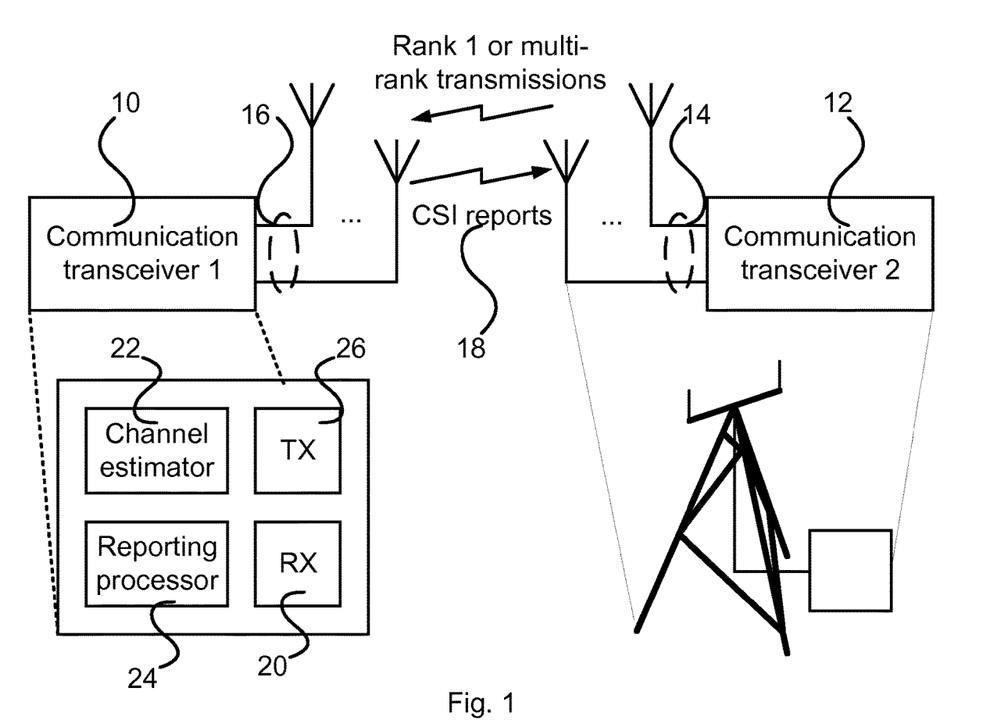
FIG. 1 schematically illustrates communication devices comprising transceivers, respectively.

By way of non-limiting example, FIG. 1 depicts an embodiment of a first transceiver 10 that receives single-rank or multi-rank transmissions from a second communication transceiver 12. The items below the respective communication transceivers 10, 12 depict examples of the communication transceivers, i.e. the communication transceiver 10 represented by elements relevant for this disclosure and the communication transceiver 12 represented by a base station. In particular, the second communication transceiver 12 ("transceiver 12") is configured to adapt its transmissions to the first communication transceiver 10 ("transceiver 10"), including transmission rank determinations, according to CSI reports 18 fed back to the transceiver 12 by the transceiver 10.

Those of ordinary skills in the wireless communication arts will appreciate that the rank of a MIMO channel matrix identifies the number of layers used for transmission of a MIMO signal. In this regard, channel rank will be understood as indicating the number of data streams that can be transmitted in parallel over the MIMO channel. As was noted earlier herein, the maximum rank of a MIMO channel is given as $\min(N_{TX}, N_{RX})$, where $N_{TX}$ denotes the number of transmit antennas available for MIMO transmission and $N_{RX}$ denotes the number of receive antennas available for reception of the MIMO transmission.

There may be a one-to-one mapping of data streams to layers, such that a Rank 2 transmission denotes two information streams, with each stream being transmitted on one of the layers. However, such is not always the case. For example, a given data stream may be mapped across two or more layers. In a baseline LTE example, an LTE MIMO transmitter transmits one CW on a single layer, when operating in a Rank 1 transmission mode, and transmits two CWs, each on a different layer, when operating in a Rank 2 transmission mode. Here, an LTE CW represents the coded bits for a given data stream, which are then mapped to modulation symbols for transmission.

The LTE baseline thus depends on a 2×2 configuration (two TX antennas and two RX antennas), and with a maximum of two CWs, denoted as CW1 and CW2. For a Rank 1 transmission, which provides only one layer (Layer 1), only one CW is transmitted, e.g., CW1 is mapped to Layer 1. For a Rank 2 transmission, two CWs are transmitted, with CW1 mapped to Layer 1, and CW2 mapped to Layer 2. Of course, higher-rank implementations may be used, and other CW-to-layer mappings may be used in higher-rank systems.

In any case, the transceiver 12 is configured for MIMO operation and correspondingly includes two or more antennas 14, for transmitting to the transceiver 10. Correspondingly, the transceiver 10 is configured for MIMO operation and includes two or more antennas 16, for receiving transmissions from the transceiver 12. The MIMO arrangement provides for spatial multiplexing MIMO and/or precoding MIMO, and the transceiver 12 thus may transmit to the transceiver 10 using single-rank transmissions, or using multi-rank transmissions.

As such, the CSI reports 18 returned to the transceiver 12 by the transceiver 10 include a RI, which indicates the preferred rank to be used for transmission to the transceiver 10. In turn, the transceiver 12 uses the CSI reports 18 to select single-rank or multi-rank transmission for transmitting to the transceiver 10. Of course, dynamically changing channel conditions may or may not allow for maximum rank transmission and UE scheduling decisions and/or resource availability at the transceiver 12 also may influence the actual rank selected for transmission.

Here, it can be noted that the transceiver 10 includes a receiver 20 that is configured to receive antenna-specific reference signals from the transceiver 12, or from any one or more other transceivers that support MIMO transmission to the transceiver 10. The receiver 20, in one or more embodiments, includes filters, amplifiers, gain control and digitization circuitry, and may include chains or branches of such circuitry for each receive antenna, to provide digital sample streams corresponding to the antenna-specific received signals.

It will be appreciated that the transceiver 10 generally receives signals sent on at least two different transmit antennas 14 by the transceiver 12. Each correspondingly received signal is then processed by the front-end circuitry in the receiver 20, which may include Analog-to-Digital Conversion (ADC) and Fast Fourier Transform (FFT) processing circuitry. The transceiver 10 then uses the resulting processed signals to perform estimation of the channel(s) from the transceiver 12 to the transceiver 10. The transceiver 10 also may be configured to provide corresponding noise covariance estimates. In more detail, the transceiver 10, in one or more embodiments, includes a channel estimator, i.e. a channel estimation circuit 22, that is configured to generate channel estimates from received reference signals, which may be pilot or other known symbol/signal information included in the signals transmitted by the transceiver 12. From the channel estimates and noise covariance estimates the Signal-to-Noise Ratios (SNRs) or Signal-to-Interference-and-Noise Ratios (SINRs) can be derived, which are then mapped to CQI values, for example.

Still further, the transceiver 10 includes a reporting processor, i.e. one or more processing circuits 24 configured to determine whether multi-rank transmission by the transceiver 12 is desired, based on evaluating channel conditions as estimated from the reference signals. The one or more processing circuits 24 are denoted as a reporting processor in FIG. 1 for easier understanding of this disclosure.

In this regard, it will be appreciated that the transceiver 10, in one or more embodiments, includes digital processing circuitry, such as one or more microprocessor and/or Digital Signal Processor (DSP) circuits. In particular, in at least one such embodiment, the processing circuits 24 are programmable digital processing circuits that are programmed (configured) to operate according to the teachings herein, based on their execution of computer program instructions stored in memory or other non-transient computer-readable medium within the transceiver 10.

According to one or more such configurations, when multi-rank transmission is desired, the processing circuits 24 are configured to send a multi-rank CSI report 18 to the transceiver 12. For the baseline LTE example, the report 18 includes two CQI values corresponding to the two CWs (CQI1 for CW1 and CQI2 for CW2). The reporting order dictates which CQI value is reported as an "absolute" value and which CQI value is an offset value, according to a bounded differential format. For example, if CQI1 is first in the ordered format, it will be reported as a 4-bit value that indicates the SIR/SINR of the first CW according to a defined CQI/SIR mapping (e.g., in dB). Then, as the second ordered value, CQI2 is reported using a 3-bit value that indicates the offset of CQI2 relative to CQI1.

For CQI reports where at least one CQI value is reported using an absolute value, and where at least one CQI value is reported relative to one or more of the absolute values, using a bounded differential reporting format, the above indicated approach of altering one or more values such that the relative reporting still provides for efficient use of resources.

Here, it can be noted that the transceiver 10 includes a transmitter 26 that is configured to transmit the reports 18 to the second communication transceiver 12. It can further be noted that the receiver 20 and transmitter 26 are also configured to receive and transmit, respectively, other transmissions between the first and the second communication transceivers 10, 12, but this is not further elucidated not to obscure the contribution of this disclosure.

According to one embodiment, it may be determined whether multi-rank transmission by the transceiver 12 is desired (from the perspective of the transceiver 10) based: (a) on estimating a first metric reflecting a single-rank channel capacity and a second metric reflecting a multi-rank channel capacity; (b) comparing the first and second metrics; and (c) determining that multi-rank transmission by the second communication transceiver is desired, based at least in part on the multi-rank channel capacity being higher than the single-rank channel capacity. Conversely, determining that single-rank transmission by the transceiver 12 is desired, rather than multi-rank transmission, is based at least in part on determining that the single-rank channel capacity is higher than the multi-rank channel capacity.

The method in one or more embodiments further includes determining whether single-rank or multi-rank transmission by the transceiver 12 is desired—again, from the perspective of the transceiver 10—on a periodic basis, according to a reporting interval that defines how frequently CSI reports 18 are sent by the transceiver 10 to the transceiver 12.

In making the above determinations, estimating the first metric comprises, in one or more embodiments, estimating a first mutual information value or other channel capacity metric that assumes a diversity transmission by the transceiver 12. For example, the first metric is computed based on the received signal gain that would be obtained by the transceiver 12 using two or more of its antennas 14 for transmitting the same signal to the transceiver 10, for spatial transmission diversity gain.

In this regard, it will be appreciated that the channel estimation circuit 22 of the transceiver 10 is configured to estimate channel conditions with respect to particular transmit antennas 14 at the transceiver 12 and/or between specific pairings or combinations of transmit antennas 14 and receive antennas 16. Thus, the processing circuits 24 can estimate the SNR gain or other signal improvement that would be gained by the transceiver 12 performing a diversity transmission to the transceiver 10.

Estimating the second metric, on the other hand, presupposes a multi-rank transmission by the transceiver 12, wherein the transceiver 12 sends independent streams via spatial multiplexing, with each spatial multiplexing layer carrying a different stream. This transmission configuration offers the potential of receiving more information, as compared to a single-rank transmission (even with diversity transmission), but that potential may not be realized, depending on channel conditions. Particularly, the full potential of multi-rank transmission may not be realized, given the use of a differential reporting format for multi-rank CQI reporting.

Figure 2:
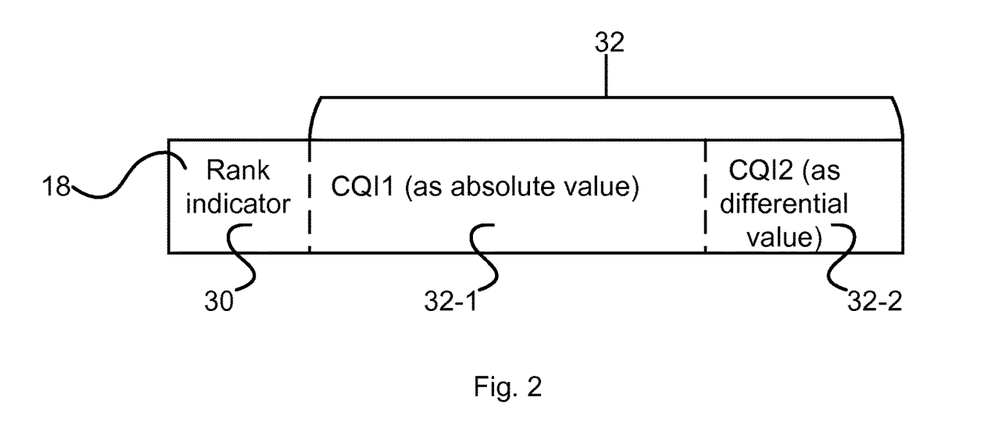
FIG. 2 is a diagram of a multi-rank CQI report.

FIG. 2 illustrates a diagram of a multi-rank CSI report 18. In FIG. 2 only two CQI values 32 are illustrated for the easier understanding, but the principle for higher ranks should be readily understood as further values represented by differential values. The reporting format comprises one value represented as an absolute value and other values represented differentially in view of the absolute value representation, e.g., CQI 32-1 reported using an absolute, 4-bit index value for a first spatial multiplexing channel and CQI 32-2 reported using a differential, 3-bit offset value for a second spatial multiplexing channel. The CSI report 18 may further comprise a rank indicator 30. The CSI report may also include a PMI, and may also comprise other information, such as performance metric, etc.

Returning to the baseline LTE example, a Rank 1 transmission uses a single CW (CW1), while a Rank 2 transmission uses two CWs (CW1 and CW2), where CW1 is mapped to Layer 1 of the MIMO channel and CW2 is mapped to Layer 2 of the MIMO channel. In one embodiment for this context, the transceiver 10 is configured to compute the first metric as a mutual information value or other channel capacity metric corresponding to a 4-bit CQI value, as would be reported for a single CW. Further, the transceiver 10 is configured to compute the second metric as a summation of the mutual information values or other channel capacity metrics, for the two CWs (CW1 and CW2), where the CQI for one of them is reported using the full 4-bit format, while the CQI for the remaining one of them is reported using the 3-bit differential reporting format. Here, the transceiver 10 can test which CQI pair yields the better metric.

It is important to understand that the above methods may be performed either when deriving the preferred CQI value, such that a CQI pair with too large difference may be discarded entirely from the set from which the preferred CQI pair is selected, or following CQI pair selection, as an initial step when building the CQI report. The above demonstrated channel estimator and reporting processor may in some embodiments be implemented by a common processor, wherein the alternatives discussed above clearly are not an issue.

The above procedure is described for two CWs, thus comprising two CQI values. However, the same principle may be applied to a communications system comprising more CWs or parallel CQI values to be reported that also suffer from the same or similar limitations in CQI reporting, i.e. from limited dynamic range of differential reporting. For example, in some embodiments, the determining of the CQI set may comprise altering at least one of the extreme values of the CQI set when the bounded differential reporting format prevents the extreme values of the CQI set to be accurately reported. The extreme values may in such cases be treated similar as a "pair" as demonstrated above. The extreme values are values of the CQI set having the largest mutual difference, i.e. demanding the largest dynamic of the differential reporting. Thus, if there are only two values, i.e. a pair, these two values are inherently the extreme values.

Figure 3:
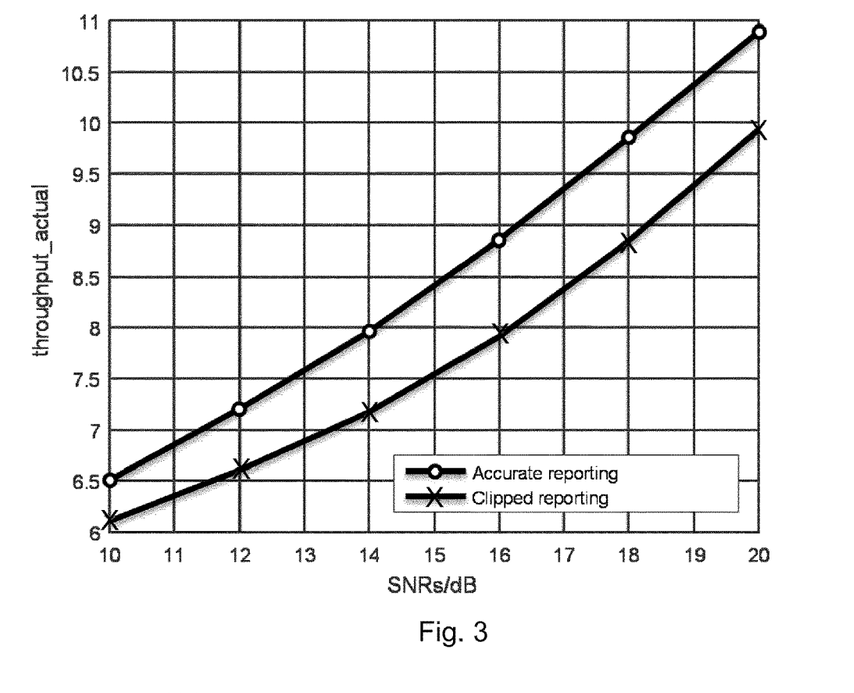
FIG. 3 is a diagram illustrating performance of accurately reported and clipped value CQIs.

FIG. 3 is a diagram illustrating the performance loss of using differentially reported CQI with values being clipped (marked as x) compared with an accurately reported CQI (marked with o). The channel used is medium correlated and may be considered as typical for many multi-rank scenarios. The diagram illustrates throughput versus SNR. As can be seen from the diagram of FIG. 3, there is a non-negligible room for performance improvement in throughput at a given SNR by using a more accurate reporting approach.

Figure 4:
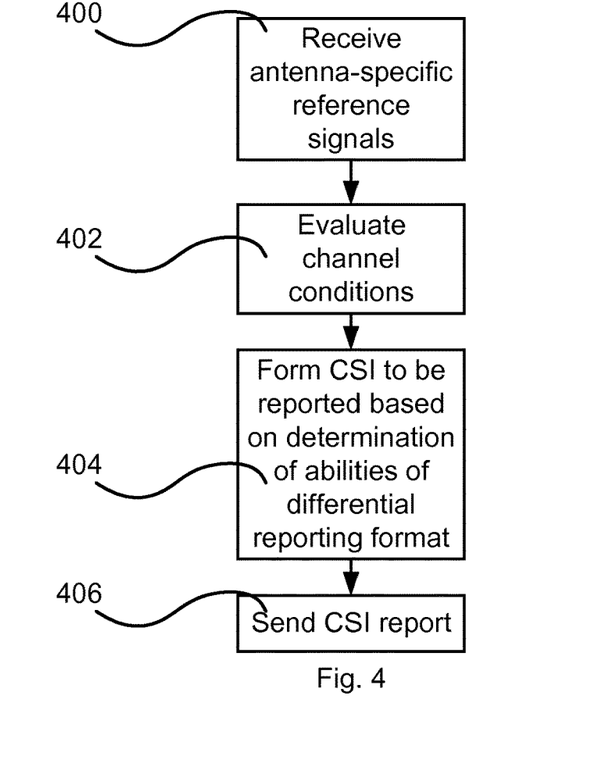
FIG. 4 is a flow chart illustrating a method according to an embodiment.

FIG. 4 is a flow chart illustrating a method of reporting CSI according to an embodiment. The CSI preferably includes a multi-rank channel quality by a multi-rank CQI which reports a CQI set. However, as will be further demonstrated below, the CSI may, under some conditions, comprise a single-rank CQI instead. The method comprises receiving 400 antenna-specific reference signals which are provided for the multiple antenna combinations. Here, the skilled person recognizes that these may be discriminated through different pre-coding for the different combinations, where the pre-coding may be set by a pre-coding matrix. The used pre-coding matrix may be signalled by a Pre-coding Matrix Indicator (PMI). From the reference signals, channel conditions are evaluated 402 to determine values of a CQI set. Here, according to some embodiments, one or more CQI sets may be obtained depending on the implementation, as will be further discussed below. The CQI to be reported is then determined 404 by determining the abilities of differential reporting format for the obtained CQI set(s). As discussed above, the differential reporting format has limited dynamic range by being a bounded reporting format, i.e. a limited number of bits are used for the differential reporting. Thus, it is not possible to resolve the full range of allowed CQI values. By determining whether the bounded differential reporting format prevents values of the obtained CQI set(s) to be accurately reported, i.e. whether clipping may occur due to the bounded reporting format, and if (some of) the obtained CQI set(s) is unable to be accurately reported, a CQI set is determined such that the bounded differential reporting format allows the values of the CQI set to be accurately reported to reduce under-reporting or over-reporting errors that arise from the use of the bounded differential reporting format. Thereby, the forming 404 of a CSI report including a multi-rank CQI set from the values of the CQI set is performed. The CSI report including the multi-rank CQI is then sent 406 using the bounded differential reporting format.

According to some embodiments the determining of the CQI set comprises altering at least one of the extreme values of the CQI set when the bounded differential reporting format prevents the extreme values of the CQI set to be accurately reported. The principle is that the dynamic range is decreased in a controlled way, i.e. not just clipped in an uncontrolled way as is the case when the dynamic range of the differential reporting format is not enough for reporting accurately. One approach for doing this in a controlled way is to evaluate expected performance result of the altered report. FIG. 4 illustrates an embodiment where this is done in an iterative way until a CQI that can be accurately reported is achieved. The actions illustrated in FIG. 5 correspond to an example of how the forming 404 of the CSI report in FIG. 4 may be performed.

Figure 5:
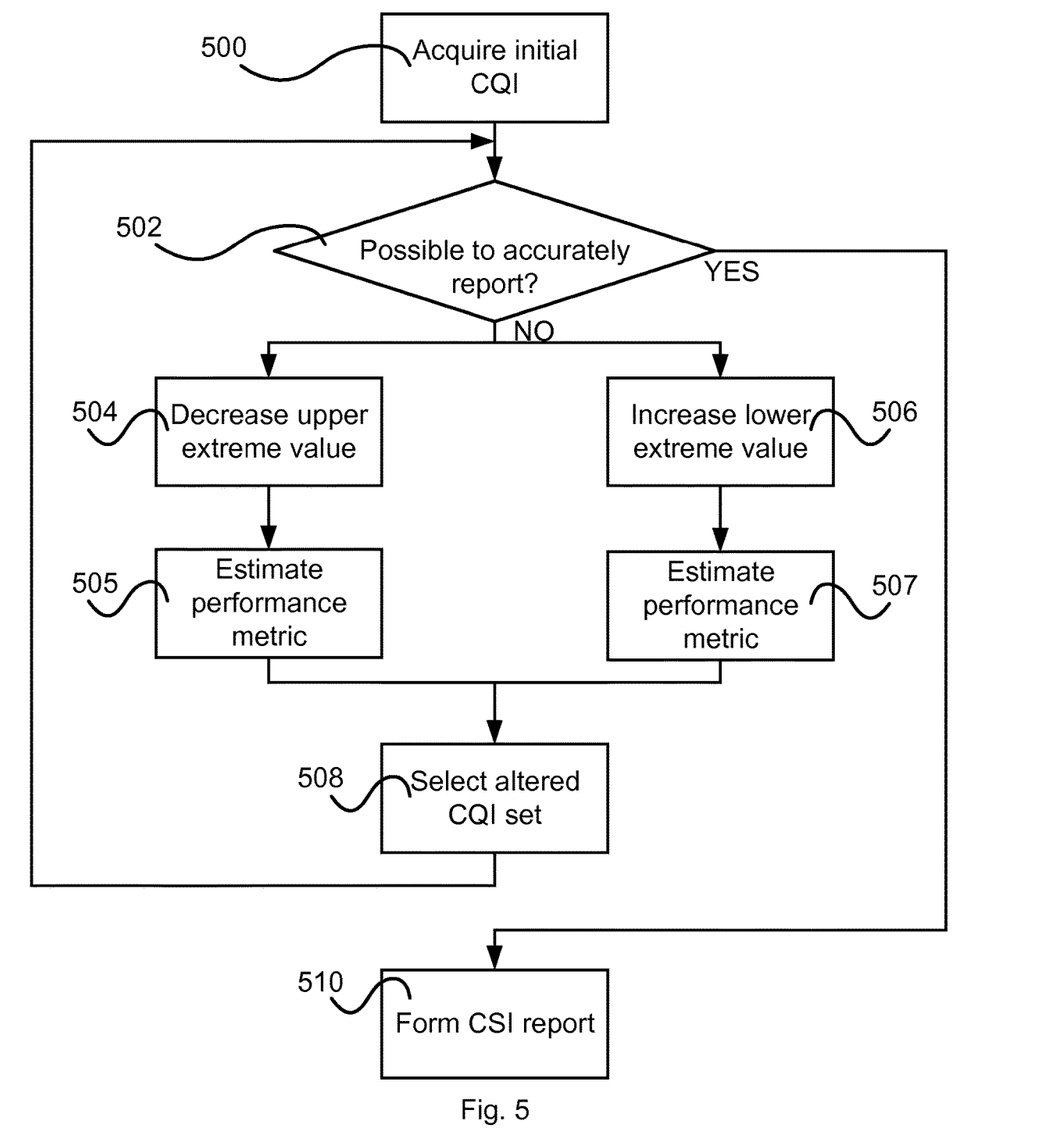
FIG. 5 is a flow chart illustrating a method according to an embodiment.

Thus, an initial CQI set is acquired 500 from the channel estimator. The CQI set is checked 502 for whether accurate reporting is possible with the differential reporting format. If it is (YES), that CQI set is used for forming 510 the CQI for reporting. If not (NO), two new altered CQI sets are formed 504, 506, wherein a first one is formed by decreasing 504 an upper extreme value and a second one is formed by increasing 506 a lower extreme value. Performance metrics are estimated 505, 507 for both the first altered CQI set and the second altered CQI set. One of them is selected 508 based on their respective performance metrics. One approach is to select the one that has the best performance metric, but also other criteria may be considered, e.g. performance evaluation of previous loop in the flow. The selected CQI set is checked 502 whether being possible to be accurately reported, and if it is (YES), that CQI set is used for forming 510 the CQI for reporting. If not (NO), the loop is reprocessed until a preferred CQI set is found. Here, the case may be that the multi-rank CQI that is possible to report has lower performance metrics than for a corresponding single-rank CQI. According to some embodiments, there may be an estimation of performance for such a single-rank CQI and comparison, wherein the single-rank CQI may be used instead for forming the CSI report.

According to some embodiments, the method may include comparing a performance metric of the multi-rank CQI with a performance metric of a multi-rank CQI for another transmission setup comprising at least one of a different rank, a different precoding matrix indicator and different CQI values. When the multi-rank CQI performance metric for the another transmission setup is preferred, the CSI report including the multi-rank CQI for the another transmission setup may be used instead of the original multi-rank CQI.

According to another embodiment, where a set of CQI sets are obtained, e.g. for a multitude of possible setups, the determining of the CQI set may comprise selecting, among a subset of the available CQI sets where the bounded differential reporting format allows the extreme values of the CQI set to be accurately reported, a CQI set providing a preferred performance metric. For example, the CQI set providing the best performance metric may be selected.

Also in these latter demonstrated embodiments, the multi-rank CQI may be challenged by a single-rank CQI, and when the single-rank CQI outperforms any multi-rank CQI, the single-rank CQI may be selected.

The performance metric may be estimated as an expected throughput, expected mutual information, expected latency, etc. or a combination thereof. According to some embodiments, performance values for forming the performance metric or the performance metric directly may be obtained from tables. The tables may be based on simulations and/or statistics. The input value or values for looking up the tables may comprise measured values from the channel evaluation wherein a set of performance metric indicators and the corresponding CQI set are derived from the table. The measured values may for example comprise SNR. According to some embodiments a table is looked up based on the measured values such that one or more sets of performance values, e.g. MI, and corresponding CQI sets are achieved. The performance metric for respective CSI candidate report including respective CQI set to be evaluated is estimated by aggregating corresponding performance values, or aggregating functions thereof. The function for aggregating the performance values may be a function suitable for the kind of performance values used.

To summarize the terminology and principles used above, we start with a CQI value, which is a representation of codeword capacity for a layer. Since one or more layers may be used, a CQI set may comprise one or more CQI values for a codeword. A single-rank CQI set comprises a single CQI value and a multi-rank CQI set comprises two or more CQI values. A CQI set is used for CSI reporting, where a CSI report may comprise a CQI set and corresponding RI and PMI, but may also comprise other information such as performance metric, preferably aggregated performance metric. One or more CSI candidate reports may be considered wherein one CSI report is selected and transmitted to a network node, e.g. based on its performance metric.

Figure 6:
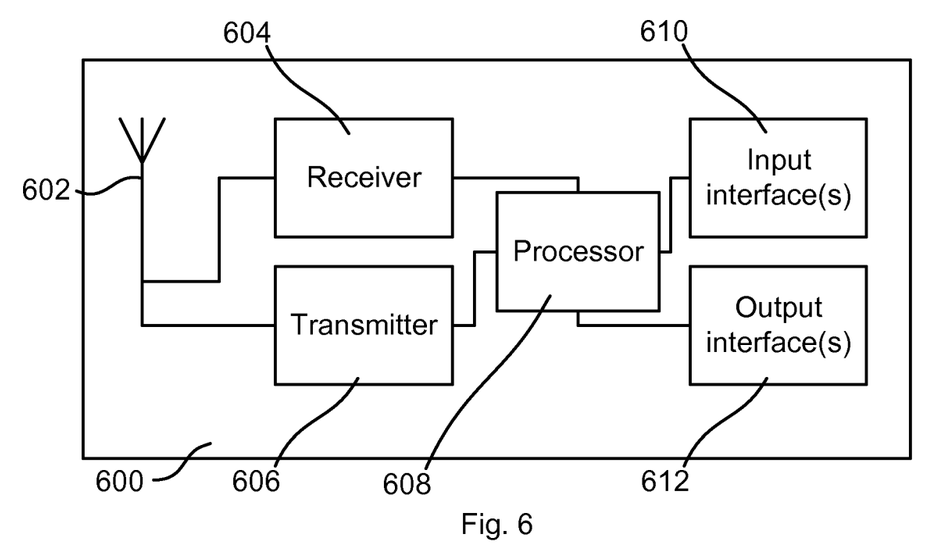
FIG. 6 is a block diagram schematically illustrating a communication device according to an embodiment.

FIG. 6 is a block diagram schematically illustrating a UE 600 according to an embodiment. The UE comprises an antenna arrangement 602, a receiver 604 connected to the antenna arrangement 602, a transmitter 606 connected to the antenna arrangement 602, a processing element 608 which may comprise one or more circuits, one or more input interfaces 610 and one or more output interfaces 612. The interfaces 610, 612 can be user interfaces and/or signal interfaces, e.g. electrical or optical. The UE 600 is arranged to operate in a cellular communication network. In particular, by the processing element 608 being arranged to perform the embodiments demonstrated with reference to FIGS. 1 to 5, the UE 600 is capable of providing an accurate CSI reporting as demonstrated above. The processing element 608 can also fulfil a multitude of tasks, ranging from signal processing to enable reception and transmission since it is connected to the receiver 604 and transmitter 606, i.e. the forming of an accurate reporting of CSI, in particular CQI, where clipping of differentially represented CQI values which clipping is out of control is avoided and thus reducing under- or over-reporting, but may also be capable of executing applications, controlling the interfaces 610, 612, etc.

Figure 7:
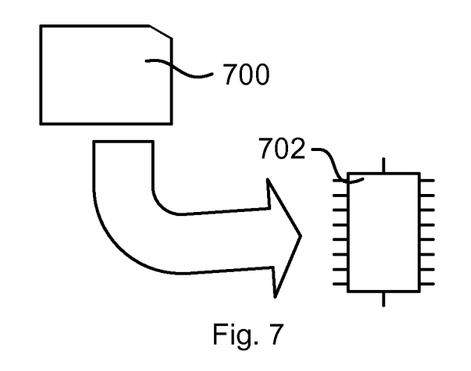
FIG. 7 schematically illustrates a computer-readable medium and a processing device.

The methods disclosed herein may be suitable for implementation with aid of processing means, such as computers and/or processors, especially for the case where the processing element 608 demonstrated above comprises a processor handling channel quality reporting. Therefore, there is provided computer programs, comprising instructions arranged to cause the processing means, processor, or computer to perform the steps of any of the methods according to any of the embodiments described with reference to FIGS. 1 to 5. The computer programs preferably comprise program code which is stored on a computer readable medium 700, as illustrated in FIG. 7, which can be loaded and executed by a processing means, processor, or computer 702 to cause it to perform the methods, respectively, according to embodiments of the present invention, preferably as any of the embodiments described with reference to FIGS. 1 to 5. The computer 702 and computer program product 700 can be arranged to execute the program code sequentially where actions of the any of the methods are performed stepwise. The processing means, processor, or computer 702 is preferably what normally is referred to as an embedded system. Thus, the depicted computer readable medium 700 and computer 702 in FIG. 7 should be construed to be for illustrative purposes only to provide understanding of the principle, and not to be construed as any direct illustration of the elements.

Figure 8:
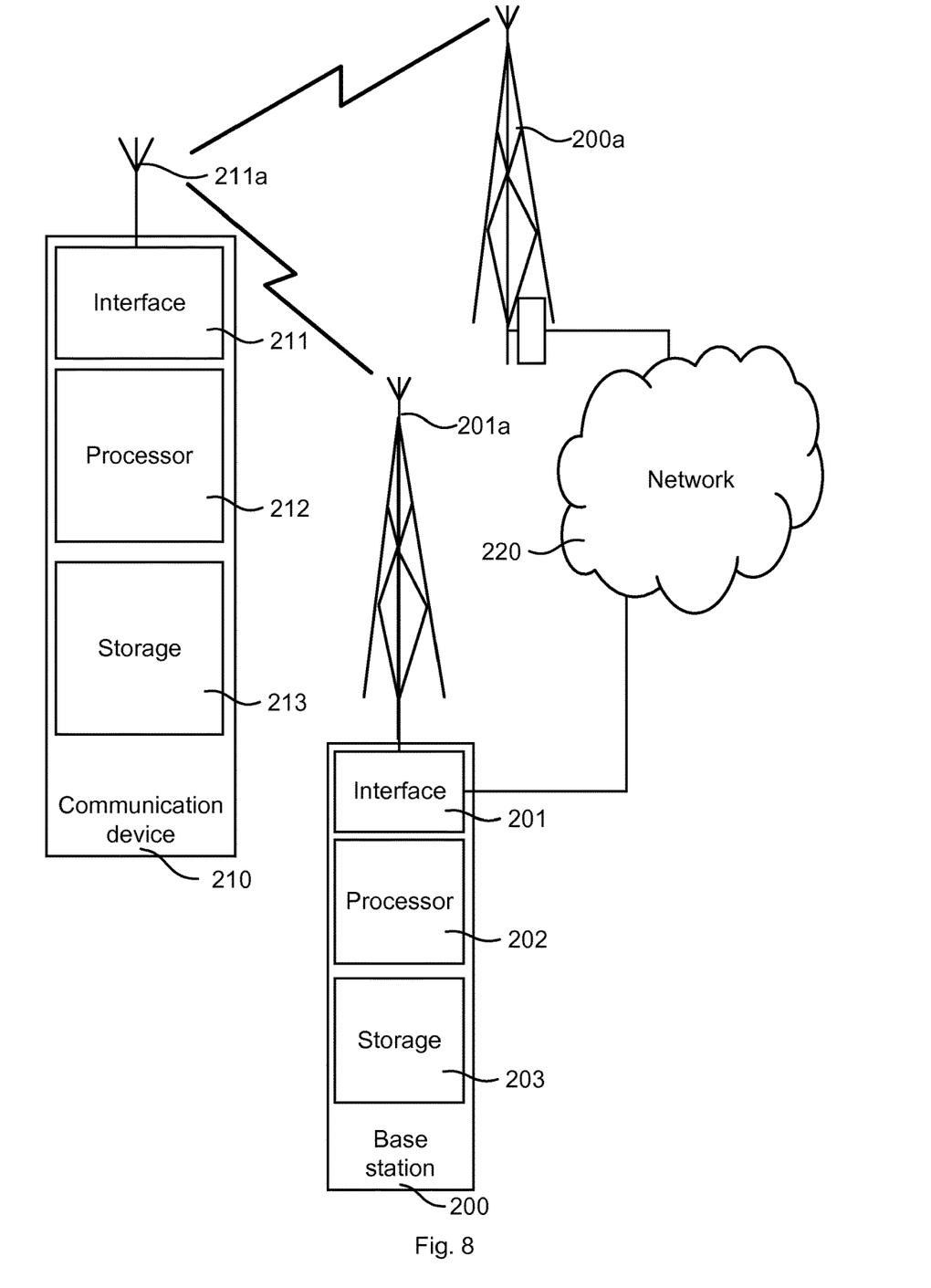
FIG. 8 illustrates a wireless network comprising a network node and a communication device.

FIG. 8 illustrates a wireless network comprising a more detailed view of a network node 200 and a communication transceiver 210, in accordance with a particular embodiment. For simplicity, FIG. 8 only depicts network 220, network nodes 200 and 200*a*, and communication transceiver 210. Network node 200 comprises processor 202, storage 203, interface 201, and antenna set 201*a*. Similarly, the communication transceiver 210 comprises processor 212, storage 213, interface 211 and antenna set 211*a*. These components may work together in order to provide network node and/or wireless device functionality. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 200 comprises processor 202, storage 203, interface 201, and antenna set 201*a*. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). Similarly, network node 200 may be composed of multiple physically separate components (e.g., a NodeB component and a Radio Network Controller (RNC) component, a Base Transceiver Station (BTS) component and a Base Station Controller (BSC) component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna set 201*a* may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as communication transceiver 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or communication transceiver 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna set 201*a*. The radio may receive digital data that is to be sent out to other network nodes or communication transceivers via a wireless connection. The radio may convert the digital data into a radio signal having the appropriate channel and bandwidth parameters. The radio signal may then be transmitted via antenna set 201*a* to the appropriate recipient (e.g., communication transceiver 210).

Antenna set 201*a* may be any type of antenna capable of transmitting and receiving data and/or signals wirelessly. Here, the antenna set 201*a* is to be considered as a plurality of antennas such that multi-rank transmissions are enabled. In some embodiments, antenna set 201*a* may comprise two or more omnidirectional, sector or panel antennas operable to transmit/receive radio signals between, for example, 700 MHz and 66 GHz. An omnidirectional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

The communication transceiver 210 may be any type of communication device, wireless device, UE, D2D device or ProSe (Proximity Service) UE, but may in general be any device, sensor, actuator, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine-to-machine (M2M) communication, etc., which is able to wirelessly send and receive data and/or signals to and from a network node, such as network node 200 and/or other communication transceivers. The communication transceiver 210 comprises processor 212, storage 213, interface 211, and antenna 211*a*. Like network node 200, the components of communication transceiver 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other communication transceiver 210 components, such as storage 213, communication transceiver 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, RAM, ROM, removable media, or any other suitable local or remote memory component. Storage 213 may store any suitable data, instructions, or information, including software and encoded logic, utilized by communication transceiver 210. Storage 213 may be used to store any calculations made by processor 212 and/or any data received via interface 211.

Interface 211 may be used in the wireless communication of signalling and/or data between communication transceiver 210 and network node 200. For example, interface 211 may perform any formatting, coding, or translating that may be needed to allow communication transceiver 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omnidirectional, sector or panel antennas operable to transmit/receive radio signals between 2 GHz and 66 GHz. For simplicity, antenna 211a may be considered a part of interface 211 to the extent that a wireless signal is being used.

In some embodiments, the components described above may be used to implement one or more functional modules used in D2D communication. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any features or functions disclosed herein. The modules may further be configured to perform other functions or steps not explicitly described herein but which would be within the knowledge of a person skilled in the art.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:
1. A method of reporting Channel State Information (CSI) including a Channel Quality Indicator (CQI) set, the method comprising:
receiving antenna-specific reference signals;
evaluating channel conditions from the antenna-specific reference signals to determine values of the CQI set;
determining whether a bounded differential reporting format prevents the values of the CQI set from being accurately reported;
when it is determined that the bounded differential reporting format prevents extreme values of the CQI set from being accurately reported, altering at least one of the extreme values of the CQI set to allow the values of the CQI set to be reported, wherein the altering the at least one of the extreme values comprises:
a) altering a first extreme value of the CQI set and determining a first performance metric for the CQI set comprising the altered first extreme value;
b) altering a second extreme value of the CQI set and determining a second performance metric for the CQI set comprising the altered second extreme value of the CQI set;
c) determining which of the first and second performance metrics represents a preferred performance metric and assigning the corresponding values as new first and second extreme values; and
d) determining whether the bounded differential reporting format allows the new first and second extreme values to be accurately reported, and when it is determined that the bounded differential reporting format does not allow the new first and second extreme values to be accurately reported, repeating steps a)-d);
forming a CSI report including the values of the CQI set using the bounded differential reporting format; and
sending the CSI report.
2. The method of claim 1, wherein the altering any of the first and the second extreme values in operation a) and b), respectively, comprises increasing or decreasing the extreme value by an amount such that a difference between the first and the second extreme values decreases.
3. The method of claim 1, further comprising:
comparing a performance metric of a CSI candidate report including a multi-rank CQI set with a further performance metric of a further CSI candidate report including a multi-rank CQI set associated with another transmission setup comprising at least one of a different rank, a different precoding matrix indicator, and different CQI values; and
when the further performance metric is preferred, forming and sending, as the CSI report, the further CSI candidate report.
4. The method of claim 1, wherein determining a performance metric comprises:
looking up a table based on measured values from a channel evaluation to achieve at least a set of performance values and a corresponding CQI set; and
estimating an aggregate performance metric from the set of performance values for a CSI candidate report including the CQI set to be evaluated.
5. The method of claim 1, further comprising:
comparing a performance metric of a CSI candidate report including a multi-rank CQI set with a further performance metric of a further CSI candidate report including a single-rank CQI set; and
when the further performance metric is preferred, sending, as the CSI report, the further CSI candidate report including the single-rank CQI set instead of the CSI candidate report including the multi-rank CQI set.

6. A non-transitory computer-readable medium storing computer-executable instructions that, when executed by a processor of a communication device, configure the communication device to perform operations corresponding to the method according to claim 1.

7. A communication device arranged to operate in a cellular communication system and report Channel State Information (CSI) including a Channel Quality Indicator (CQI) set, the communication device comprising:
 a receiver arranged to receive antenna-specific reference signals;
 a channel estimator arranged to evaluate channel conditions from the antenna-specific reference signals to determine values of the CQI set;
 a transmitter arranged to send a CSI report; and
 a reporting processor arranged to:
  determine whether a bounded differential reporting format prevents the values of the CQI set from being accurately reported;
  when it is determined that the bounded differential reporting format prevents extreme values of the CQI set from being accurately reported, alter at least one of the extreme values of the CQI set to allow the values of the CQI set to be reported, wherein the reporting processor is arranged to alter the at least one of the extreme values by:
   a) altering a first extreme value of the CQI set and determining a first performance metric for the CQI set comprising the first altered extreme value;
   b) altering a second extreme value of the CQI set and determining a second performance metric for the CQI set comprising the second altered extreme value of the CQI set;
   c) determining which of the first and second performance metrics represents a preferred performance metric and assigning the corresponding values as new first and second extreme values; and
   d) determining whether the bounded differential reporting format allows the new first and second extreme values to be accurately reported, and when it is determined that the bounded differential reporting format does not allow the new first and second extreme values to be accurately reported, repeating steps a)-d); and
  form the CSI report including the values of the CQI set using the bounded differential reporting format.

8. The communication device of claim 7, wherein the reporting processor is arranged to alter any of the first and the second extreme values in a) and b), respectively, by increasing or decreasing the extreme value by an amount such that a difference between the first and the second extreme values decreases.

9. The communication device of claim 7, wherein the reporting processor is further arranged to:
 compare a performance metric of a CSI candidate report including a multi-rank CQI set with a further performance metric of a further CSI candidate report including a multi-rank CQI set associated with another transmission setup comprising at least one of a different rank, a different precoding matrix indicator, and different CQI values; and
 when the further performance metric is preferred, form and cause the transmitter to send, as the CSI report, the further CSI candidate report.

10. The communication device of claim 7, wherein the reporting processor is further arranged to:
 compare a performance metric of a CSI candidate report including a multi-rank CQI set with a further performance metric of a further CSI candidate report including a single-rank CQI set; and
 when the further performance metric is preferred, cause the transmitter to send, as the CSI report, the further CSI candidate report including the single-rank CQI set instead of the CSI candidate report including the multi-rank CQI set.

11. The communication device of claim 7, wherein the reporting processor is arranged to:
 determine a performance metric by looking up a table based on measured values from a channel evaluation to achieve at least a set of performance values and a corresponding CQI set; and
 estimate an aggregate performance metric from the set of performance values for a CSI candidate report including the CQI set to be evaluated.

* * * * *